United States Patent
Idelevitch et al.

(10) Patent No.: US 10,328,788 B2
(45) Date of Patent: Jun. 25, 2019

(54) ELECTRIC DRIVE UNIT FOR A WHEEL OF A MOTOR VEHICLE AND WHEEL SUSPENSION FOR THE WHEELS OF AN AXLE OF A MOTOR VEHICLE

(71) Applicant: AUDI AG, Ingolstadt (DE)

(72) Inventors: Vladimir Idelevitch, Nürnberg (DE);
Stephan Beutler, Ingolstadt (DE);
Sebastian Schindler, Ingolstadt (DE);
Tobias Kollorz, Postbauer-Heng (DE);
Stephan Römling, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/603,764

(22) Filed: May 24, 2017

(65) Prior Publication Data
US 2017/0341503 A1 Nov. 30, 2017

(30) Foreign Application Priority Data

May 27, 2016 (DE) .......................... 10 2016 006 536

(51) Int. Cl.
*B60K 1/00* (2006.01)
*B60K 7/00* (2006.01)
(Continued)

(52) U.S. Cl.
CPC .............. *B60K 7/0007* (2013.01); *B60G 5/04* (2013.01); *B60G 21/051* (2013.01); *B60L 50/00* (2019.02); *B62D 7/20* (2013.01); *B62D 25/24* (2013.01); *B62D 29/041* (2013.01); *F16D 3/065* (2013.01); *F16H 35/18* (2013.01); *B60B 35/14* (2013.01);
(Continued)

(58) Field of Classification Search
CPC .............................. B60K 7/0007; B60K 7/00; B60K 2007/0092; B60K 2007/0046; B60L 11/00; B60L 2220/40; B60L 2220/46; F16H 35/00; F16H 35/18; B60B 35/00; B60B 35/14; B60B 35/12
See application file for complete search history.

(56) References Cited

U.S. PATENT DOCUMENTS 3,404,747 A 10/1968 Fagel
7,686,315 B2 * 3/2010 Kramer .................. B60G 3/145
180/65.51
(Continued)

FOREIGN PATENT DOCUMENTS

CN 1509915 A 7/2004
CN 101516663 A 8/2009
(Continued)

OTHER PUBLICATIONS

German Examination Report dated Jan. 4, 2017 of priority German application No. 102016006536.2; 8 pgs.
(Continued)

*Primary Examiner* — James M Dolak
(74) *Attorney, Agent, or Firm* — Maier & Maier, PLLC

(57) ABSTRACT

An electric drive unit for a wheel of a motor vehicle, including an electric motor for driving a drive shaft joined to the wheel in a manner resistant to rotation. The drive shaft is disposed coaxial to the rotor of the electric motor and is joined thereto in a rotation-resistant manner. The drive shaft is joined to the rotor of the electric motor in a rotation-resistant and axially moveable manner via a bearing.

12 Claims, 3 Drawing Sheets

(51) Int. Cl.
  *B60G 5/04* (2006.01)
  *B62D 7/20* (2006.01)
  *B62D 29/04* (2006.01)
  *F16D 3/06* (2006.01)
  *B60G 21/05* (2006.01)
  *B62D 25/24* (2006.01)
  *F16H 35/18* (2006.01)
  *B60L 50/00* (2019.01)
  *B60B 35/14* (2006.01)
  *F16C 3/035* (2006.01)
  *F16H 25/20* (2006.01)
  *B62D 21/11* (2006.01)

(52) U.S. Cl.
  CPC .... *B60G 2200/422* (2013.01); *B60G 2204/18* (2013.01); *B60G 2300/50* (2013.01); *B60K 2007/0046* (2013.01); *B60K 2007/0092* (2013.01); *B60L 2220/40* (2013.01); *B62D 21/11* (2013.01); *B62D 29/04* (2013.01); *F16C 3/035* (2013.01); *F16H 25/20* (2013.01); *F16H 2025/204* (2013.01); *F16H 2025/2075* (2013.01); *F16H 2025/2096* (2013.01)

(56) References Cited

U.S. PATENT DOCUMENTS

| | | | | |
|---|---|---|---|---|
| 7,753,151 B2* | 7/2010 | Marsh | ...................... | B60G 3/00 180/372 |
| 7,870,918 B2* | 1/2011 | Muller | .................. | B60G 15/07 180/65.51 |
| 7,886,858 B2* | 2/2011 | Ai | ........................ | B60K 7/0007 180/65.51 |
| 8,083,245 B2* | 12/2011 | Hatzikakidis | ............ | B60G 3/12 280/124.128 |
| 8,640,801 B2* | 2/2014 | Hennings | ............. | B60K 7/0007 180/65.6 |
| 9,233,602 B2* | 1/2016 | Mair | .................... | B60K 7/0007 |
| 9,546,654 B2* | 1/2017 | Rabhi | ................... | F16C 33/306 |
| 9,630,486 B2* | 4/2017 | Yamada | .................. | B60K 28/14 |
| 9,649,923 B2* | 5/2017 | Perlo | ..................... | B60K 1/00 |
| 10,008,905 B2* | 6/2018 | Chen | ...................... | H02K 7/116 |
| 10,118,479 B2* | 11/2018 | Igi | .......................... | F16D 55/226 |
| 10,150,359 B2* | 12/2018 | Tamura | .................... | B60G 3/20 |
| 10,207,572 B2* | 2/2019 | Makino | .................... | B60K 1/02 |
| 10,207,576 B2* | 2/2019 | Makino | .................... | B60L 15/20 |
| 10,214,094 B2* | 2/2019 | Sinkko | ................. | B60K 7/0007 |
| 2004/0112657 A1 | 6/2004 | Ajiro et al. | | |
| 2008/0190677 A1 | 8/2008 | Muller et al. | | |
| 2008/0214347 A1* | 9/2008 | Scharfenberg | ....... | B60K 7/0007 475/5 |
| 2009/0236157 A1 | 9/2009 | Akamatsu | | |
| 2010/0025644 A1* | 2/2010 | Jockisch | ................. | H02G 1/08 254/134.3 R |

FOREIGN PATENT DOCUMENTS

| | | |
|---|---|---|
| DE | 10343941 A1 | 5/2005 |
| DE | 102005034278 A1 | 4/2007 |
| JP | 2005153547 A | 6/2005 |
| WO | 2007/036315 A1 | 4/2007 |

OTHER PUBLICATIONS

Office Action dated Feb. 28, 2019 in corresponding Chinese Application No. 201710385060.3; 14 pages.

* cited by examiner

ELECTRIC DRIVE UNIT FOR A WHEEL OF A MOTOR VEHICLE AND WHEEL SUSPENSION FOR THE WHEELS OF AN AXLE OF A MOTOR VEHICLE

FILED

The invention relates to an electric drive unit for a wheel of a motor vehicle, as well as a wheel suspension for the wheels of an axle of a motor vehicle.

BACKGROUND

A generic electric drive unit for the wheels of an axle of a motor vehicle is disclosed in DE 103 4394 1. The electric drive unit comprises two drive shafts mounted rotatably, independently from one another, the drive shafts being driven by an electric motor. For this purpose, the electric motor has a stator that is fixed in the body and a first rotor associated with the first drive shaft and a second rotor, belonging to the second drive shaft. A control device is also provided, which controls the movement of the first rotor independently from the movement of the second rotor, in order to achieve a desired rotation of the first or second drive shaft. The circumstance that the electric motor is subjected to considerable loads via the "drive shaft" load path, for example, during compression or rebound, has been demonstrated to be a disadvantage here.

SUMMARY OF THE DISCLOSURE

The object of the invention is to enhance an electric drive unit for a wheel of a motor vehicle so that loads that occur, e.g., during compression or rebound, are equilibrated as much as possible.

In a known way, the electric drive unit for a wheel of a motor vehicle comprises an electric motor for driving a drive shaft joined to the wheel in a rotation-resistant manner, the drive shaft being arranged coaxial to the rotor and being joined to it in a rotation-resistant manner.

According to the invention, the drive shaft is joined to the rotor of the electric motor via a bearing in a manner that is resistant to rotation and axially moveable. Since the drive shaft is now joined in an axially moveable manner to the rotor of the electric motor, a decoupling of the "drive shaft-rotor" load path is advantageously realized, so that, e.g., bending angles occurring during compression or rebound can be equilibrated by an axial displacement.

In order to ensure a particularly compact structural shape of the electric drive unit, according to a preferred embodiment, the rotor is designed as a hollow part and the drive shaft is arranged inside the rotor and is joined to it in a rotation-resistant and axially moveable manner.

In order to ensure a bearing that is free of friction and wear, the rotation-resistant and axially moveable bearing between drive shaft and rotor of the electric motor is preferably designed as a ball spline.

According to another preferred embodiment, it is provided that the drive shaft is operatively connected to an adjusting unit, by means of which the drive shaft can be displaced in the axial direction with respect to the rotor. This embodiment has proven to be particularly advantageous, since now, in addition to a passive decoupling, an active adjustment of the drive shaft with respect to the rotor is made possible.

In this case, the adjusting unit preferably has an adjusting path of at least ±18 mm in the axial direction.

The adjusting unit is preferably designed in this case as an electric spindle drive.

According to a particularly preferred embodiment, the spindle drive in this case comprises a threaded spindle driven via a belt pulley, onto which is threaded a spindle nut mounted in a rotation-resistant and axially moveable manner inside the drive shaft. Based on the nested arrangement, a particularly compact drive unit claiming little structural space is advantageously made available.

Preferably, the spindle nut is operatively connected to the drive shaft via an axial bearing and the spindle nut is mounted in a rotation-resistant and axially moveable manner inside the drive shaft via a guide sleeve. The phrase axial bearing is to be understood in the present context such that the bearing can take up forces/loads in the axial direction, whereas movements in the two remaining degrees of freedom are additionally possible.

In order to produce a simple driven connection between drive shaft and the wheel to be driven, according to another preferred embodiment, a drive flange is designed at the drive shaft.

In addition, the object of the invention is to enhance a wheel suspension for the wheels of an axle of a motor vehicle in such a way that a compact, long-lasting drive of the wheels of the axle is ensured.

According to a particularly advantageous embodiment of the wheel suspension, it is provided that each of the axle journals bearing the wheels is articularly joined to a tie rod for making possible a steering movement of the wheels, whereby each of the tie rods is designed having a constant length and is mounted in an axially fixed manner structurally in the crosswise direction of the motor vehicle. This configuration has the effect that an axial displacement of the drive shaft within the rotor causes a steering movement of the wheel around the articulation point of the tie rod. That is, an articulated shaft steering that is integrated in a space-saving structure is made available in a particularly advantageous manner.

Another particularly advantageous embodiment of the wheel suspension is characterized in that the axle is designed as a composite steering axle, wherein the electric drive units associated with the wheels and the drive shafts belonging thereto are arranged flush with one another and parallel to the crosswise support of the composite steering axle, and wherein the crosswise support is designed as fiber composite material with rigidities that are different in the x, y, and z directions. Based on the different rigidities of the crosswise support in the different spatial directions, an axial movement of the drive shafts in the same direction or in opposite directions has as a consequence a different steering movement of the wheels. Therefore, a steered axle with functionally integrated tie rods is made available in an advantageous way.

BRIEF DESCRIPTION OF THE DRAWINGS

Other advantages, features and application possibilities of the present invention result from the following description in combination with the examples of embodiment shown in the drawing.

In the drawing.

DETAILED DESCRIPTION

Figure 1:
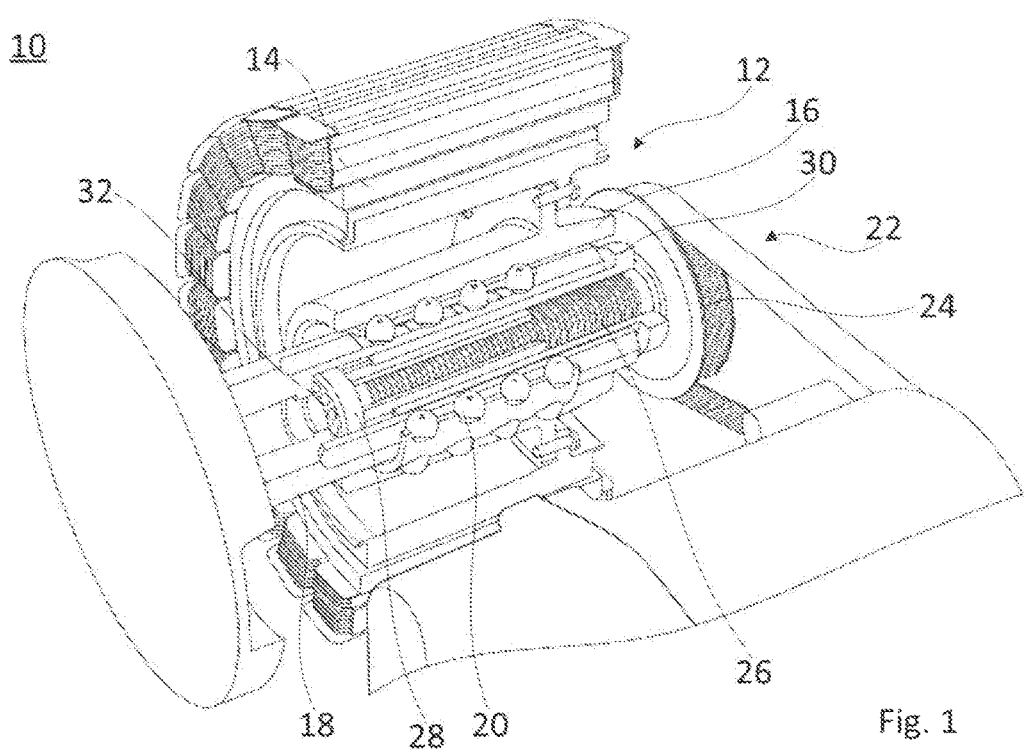
FIG. 1 shows a sectional view of the electric drive unit according to the invention for a wheel of a motor vehicle.

FIG. 1 shows an electric drive unit designated overall by the reference number 10 for a wheel of an axle of a motor vehicle. An illustration of the wheel and of other components of the wheel suspension was omitted for reasons of clarity.

As is known, the electric drive unit 10 comprises an electric motor 12 having a stator 14 and a rotor 16.

In addition, as is known, the electric drive unit 10 comprises a drive shaft 18 driven via the rotor 16 of the electric motor 12.

As can be seen from FIG. 1, rotor 16 is presently designed as a hollow part, on the inside of which the drive shaft 18 is disposed. The bearing 20 between drive shaft 18 and the rotor 16 in this case is designed as a ball spline, by means of which the drive shaft 18 is joined to the rotor 16 in a rotation-resistant and axially moveable manner.

Also, as FIG. 1 further shows, the drive shaft 18 is operatively connected to an electric adjusting unit 22. The electric adjusting unit is presently designed as an electric spindle drive 22. The electric spindle drive 22 comprises a threaded spindle 26 arranged on the inside of the drive shaft 18 and driven via a belt pulley 24. A spindle nut 28 is threaded onto the threaded spindle 26, and this is mounted in the drive shaft 18 in a rotation-resistant and axially moveable manner via a guide sleeve 30.

The spindle nut 28 is joined to the drive shaft 18 via an axial bearing 32. The drive shaft 18 can be actively displaced in the axial direction over an adjustment path of ±18 mm with respect to the rotor 16 by means of the electric adjusting unit.

The electric drive unit 10 according to the invention in particular is characterized in that a decoupling of the "drive shaft 18-rotor 16" load path is now realized based on the relative movement between drive shaft 18 and rotor 16 made possible in the axial direction, so that, e.g., bending angles occurring during compression or rebound can be equilibrated by an axial displacement between the two components. Another advantage is that an active influencing of the wheel position, e.g., for conducting steering is made possible, based on the possibility for adjustment by means of the adjusting unit 22.

Figure 2:
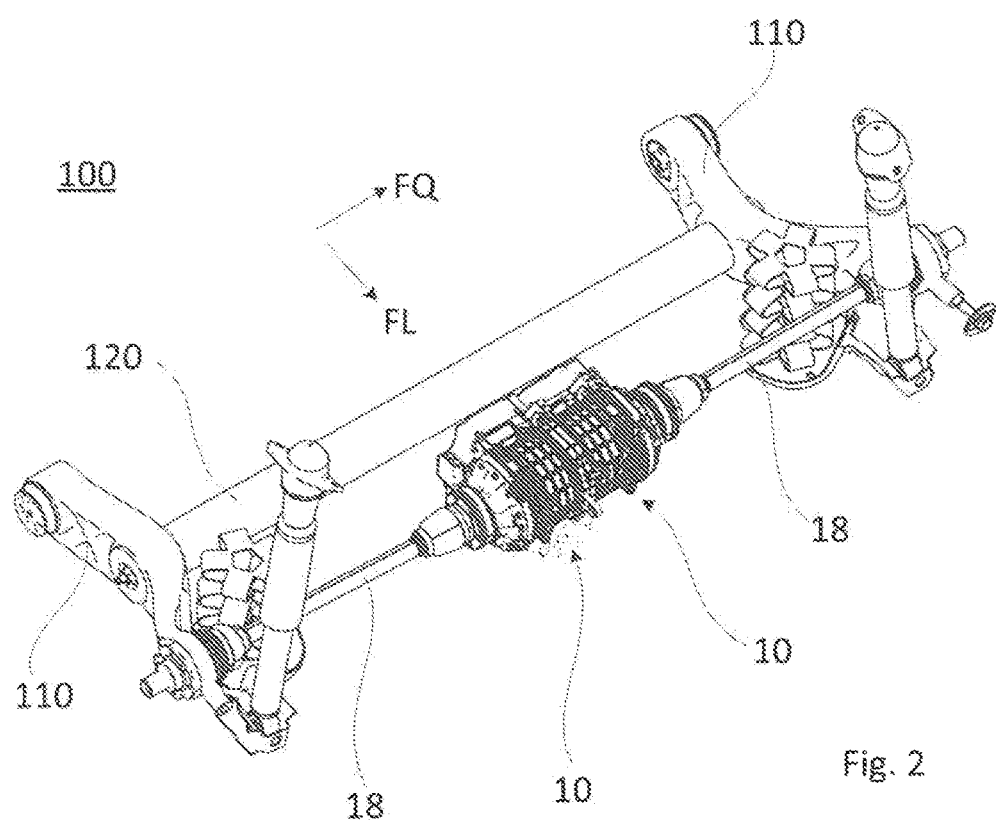
FIG. 2 shows a wheel suspension of a motor vehicle.
Figure 3:
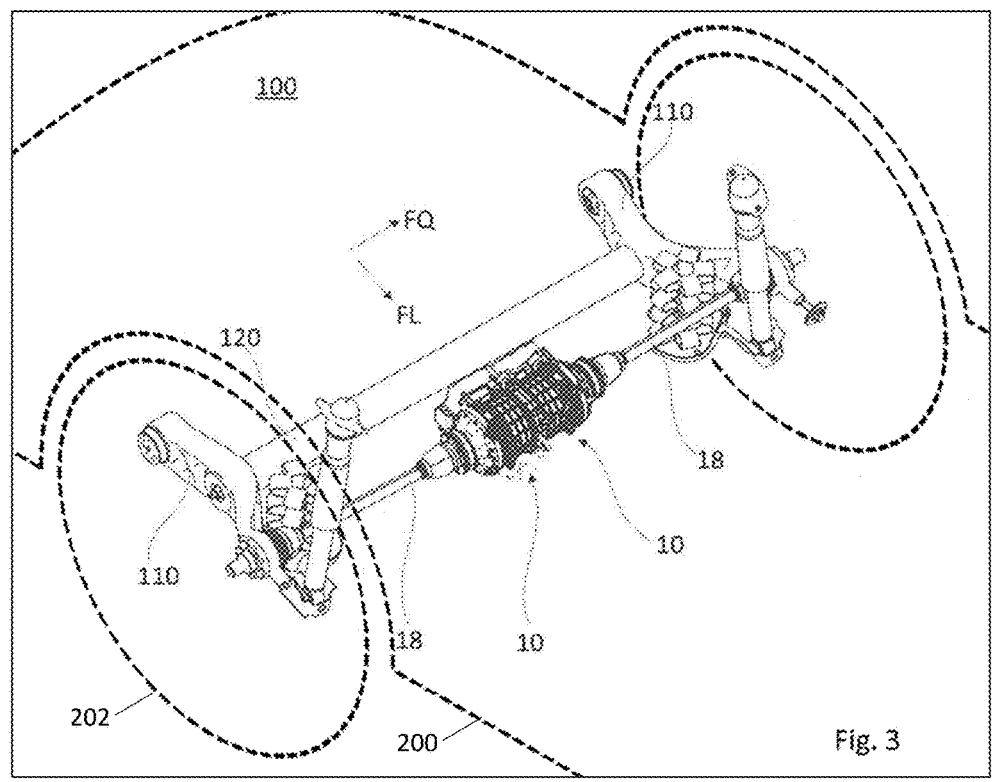
FIG. 3 shows a wheel suspension of a motor vehicle, provided together with a schematic drawing of a motor vehicle on which it is disposed.

FIG. 2 shows a wheel suspension, which is overall designated by the reference number 100, for the wheels of an axle of a motor vehicle, in which an electric drive unit 10 that drives the wheel via a drive shaft 18 is associated with each wheel. An illustration of the wheels was presently omitted for reasons of clarity. An illustration of the same figure, shown schematically with the wheels of an exemplary motor vehicle, is provided in FIG. 3.

As can be seen from FIG. 2, a composite steering axle is presently involved, having two longitudinal steering members 110 aligned in the longitudinal direction of the vehicle FL and a crosswise support 120 joining together the two longitudinal steering members in the crosswise direction of the vehicle FQ. As can be further seen from FIG. 2, the two electric drive units 10 as well as the drive shafts 12 belonging thereto are arranged flush with and parallel to the crosswise support 120.

The crosswise support 120 is made of a fiber composite material or of different fiber composite materials, so that the crosswise support 120 has different rigidities in the spatial directions—the x, y, and z directions (thus in the longitudinal, crosswise, and height directions of the vehicle). Based on the different rigidities of the crosswise support 120 in the different spatial directions, an axial movement of the drive shafts 18 in the same direction or in opposite directions has as a consequence a different steering movement of the wheels. Therefore, a steered axle with functionally integrated tie rods is made available in an advantageous way.

The invention claimed is:

1. An electric drive unit for a wheel of a motor vehicle, comprising:
an electric motor for driving a drive shaft joined to the wheel in a rotationally fixed connection, the drive shaft being disposed coaxial to a rotor of the electric motor and being joined thereto by a second rotationally fixed connection, wherein the second rotationally fixed connection joining the drive shaft to the rotor of the electric motor is a rotationally fixed bearing, and wherein the rotationally fixed bearing is axially movable.

2. The electric drive unit according to claim 1, wherein the rotor of the electric motor is a hollow part and the drive shaft is arranged on the inside of the rotor.

3. The electric drive unit according to claim 1, wherein the rotationally fixed bearing is a ball spline.

4. The electric drive unit according to claim 1, wherein the drive shaft is operatively connected to an adjusting unit, and wherein the drive shaft is configured to be displaced in the axial direction with respect to the rotor by the adjusting unit.

5. The electric drive unit according to claim 4, wherein the adjusting unit is an electric spindle drive.

6. The electric drive unit according to claim 5, wherein the spindle drive includes a threaded spindle driven via a belt pulley, and a spindle nut mounted on the inside of the drive shaft by a rotationally fixed and axially-movable connection, wherein the spindle nut is threaded onto the threaded spindle.

7. The electric drive unit according to claim 6, wherein the rotationally-fixed and axially-movable connection of the spindle nut is an axial bearing.

8. The electric drive unit according to claim 6, wherein the rotationally-fixed and axially-movable connection of the spindle nut is a guide sleeve.

9. The electric drive unit according to claim 1, wherein a drive flange is designed at the drive shaft.

10. A wheel suspension for the wheels of an axle of a motor vehicle, in which an electric drive unit that drives the wheel via a drive shaft is associated with each wheel, wherein the electric drive unit is designed according to claim 1.

11. The wheel suspension according to claim 10, wherein one or more axle journals bearing the wheels of the axle are each joined articularly to a tie rod, wherein each of the tie rods is designed having a constant length and is mounted axially fixed in terms of structure in the crosswise direction of the motor vehicle.

12. The wheel suspension according to claim 10, wherein the axle is designed as a composite steering axle, wherein two drive units and drive shafts are arranged parallel to a crosswise support of a composite steering axle, and wherein the crosswise support is designed as a fiber composite material with different rigidities in the x, y, and z directions.

* * * * *